April 28, 1970     S. G. BAUER ET AL     3,508,765

MOTORCYCLE FRAME

Filed June 4, 1968     3 Sheets-Sheet 1

INVENTORS.
STEFAN GEORGE BAUER
BERNARD HOOPER
ROBERT VICTOR TRIGG

BY Kurt Kelman
AGENT

April 28, 1970     S. G. BAUER ET AL     3,508,765
MOTORCYCLE FRAME

Filed June 4, 1968     3 Sheets-Sheet 2

INVENTORS:
STEFAN GEORGE BAUER
BERNARD HOOPER
ROBERT VICTOR TRIGG
BY Kurt Kelman
AGENT

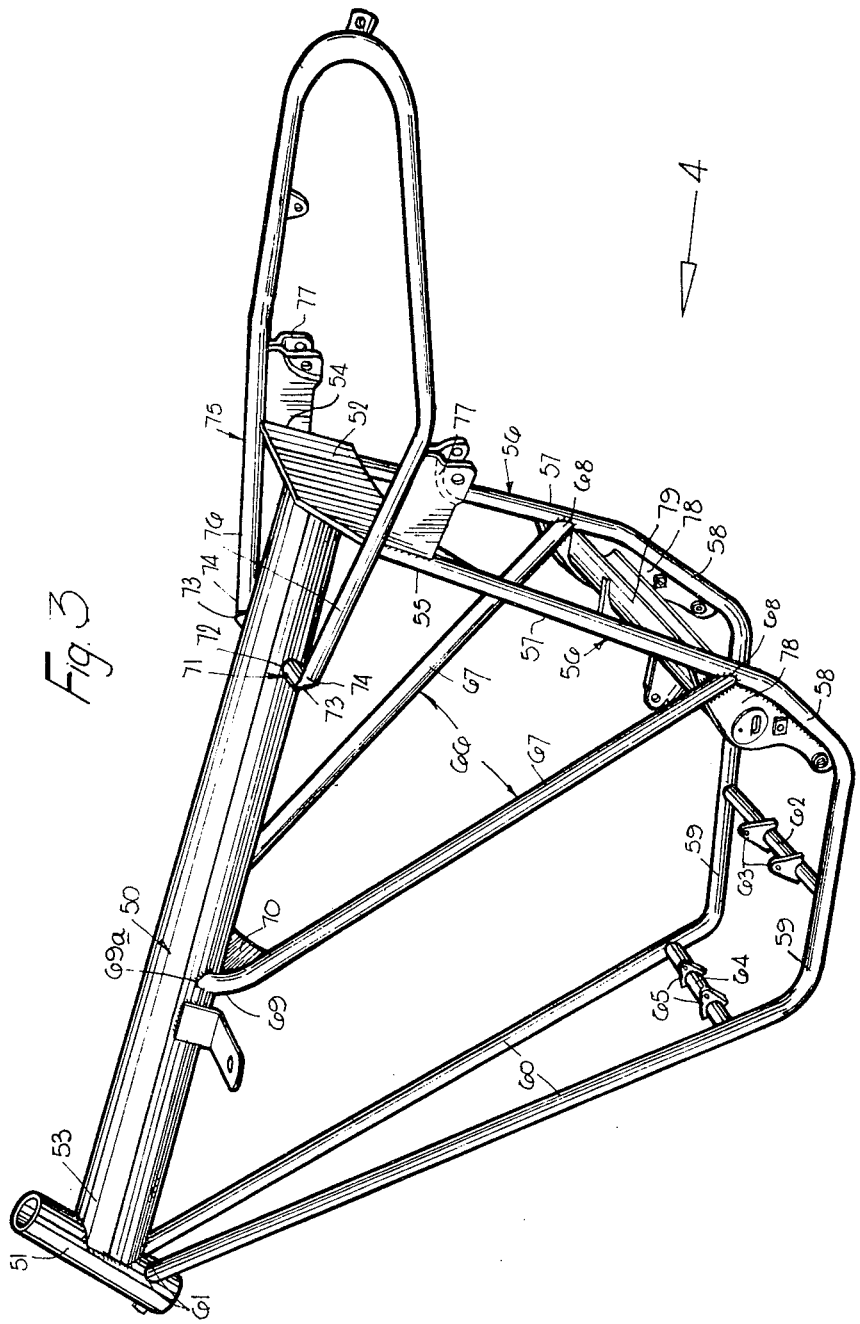

United States Patent Office
3,508,765
Patented Apr. 28, 1970

3,508,765
MOTORCYCLE FRAME
Stefan George Bauer, Hilton, Bernard Hooper, Stourbridge, and Robert Victor Trigg, Birmingham, England, assignors to Norton Villiers Limited, Wolverhampton, Staffordshire County, England, a British company
Filed June 4, 1968, Ser. No. 734,312
Claims priority, application Great Britain, June 7, 1967, 26,254/67
Int. Cl. B62k 11/02
U.S. Cl. 280—281
10 Claims

ABSTRACT OF THE DISCLOSURE

The disclosure describes motorcycle frames each of which has a straight tubular backbone which is triangulated with two pairs of straight tubes, one tube of each pair being on each side of the backbone and the tubes being connected to attachment means at the rear end, and intermediate the ends, of the backbone.

BACKGROUND OF THE INVENTION

Field of the invention

The invention relates to motorcycle frames. By "motorcycle" are included all mechanically powered, two-wheeled vehicles which are steerable and thus we include in the term motorcycles proper, scooters and mopeds.

Description of the prior art

A great number of constructions have been proposed for motorcycle frames and a great many of these proposed constructions use bent tubes which are required to take considerable bending moments when the machine is in use. In some frames, for example, there are two complete loops which are arranged side by side and are interconnected.

SUMMARY OF THE INVENTION

It is an object of the present invention to provide a simple frame in which bending moments which are generated in a main member or backbone due to the dynamic loading on the frame when it is in use are transferred into tensions or compressions in two further pairs of tubes which are triangulated with the main member. These further tubes therefore act substantially as pure ties or struts.

According to the invention we provide a motorcycle frame comprising a straight tubular backbone, a support for the front forks of the motorcycle secured to the front end of the backbone, first and second transversely-extending rigid attachment means secured to the backbone adjacent its rear end and intermediate its ends respectively said means projecting on both sides of the backbone, a first pair of spaced-apart, substantially parallel tubes extending generally downwardly from, and secured to, said first means and a second pair of spaced-apart substantially parallel tubes inclined relative to the backbone and extending rearwardly from, and secured to, said second means the tubes of each pair being arranged one on either side of the backbone, the tubes lying to one side of the backbone being joined and the tubes lying to the other side of the backbone being joined, all said tubes being straight between their junctions and the attachment means.

By this construction, the backbone is triangulated with the two pairs of tubes and since these tubes are straight within the triangulation at least, they act purely as struts or ties and do not have to take any appreciable bending moment. Preferably, the moment of inertia of the section of the backbone is considerably greater than the moments of inertia of the sections of the other tubes.

Preferably, there is provided third, transversely-extending, rigid attachment means secured to the backbone to project on both sides thereof and located between the first and second attachment means and a third pair of tubes, which is extended between the first and third attachment means, the backbone being interposed between the tubes of the third pair.

The first attachment means may comprise a plate secured to the backbone and lying in a plane substantially perpendicular to the longitudinal axis thereof. In this construction, the upper ends of the tubes of the first pair are secured to the edges of the plate which lie in generally vertical planes.

The tubes of the first and second pairs preferably either support other tubes, or the tubes of at least one of said pairs are continued, to form a generally U-shaped cradle between said support and said junctions. The limbs of the cradle will be of unequal length, the longer limbs extending so said support. This cradle will carry the power unit of the motorcycle which may comprise an engine and gear box in unit or connected together.

The second attachment means may comprise curved continuations of the tubes of the second pair, said continuations having their ends connected directly to the backbone and being reinforced by gussets to form a rigid assembly. In this construction, although each tube of the second pair will have a curved portion, this curver portion will not be able to flex and is considered to be part of the rigid attachment means because it is braced to the backbone by means of gussets.

Preferably, the frame includes a generally U-shaped loop which extends rearwardly from the backbone at the rear end thereof, said loop joining the ends of said third pair of tubes. The loop and the tubes of said third pair may comprise a single piece of tube. The loop provides a support for the rider's seat.

Preferably, attachment lugs for the rear spring suspension of the motorcycle are located adjacent the junction between the first attachment and the tubes of the first pair.

BRIEF DESCRIPTION OF THE DRAWING

The invention will now be described in detail by way of example with reference to the accompanying drawings in which:

FIGURE 3 is a perspective view similar to FIGURE 1 of a second embodiment of the invention and, FIGURE 4 is an elevation of the frame of FIGURE 3 taken in the direction of the arrow 4 in FIGURE 3.

DESCRIPTION OF THE PREFERRED EMBODIMENTS

Figure 1:
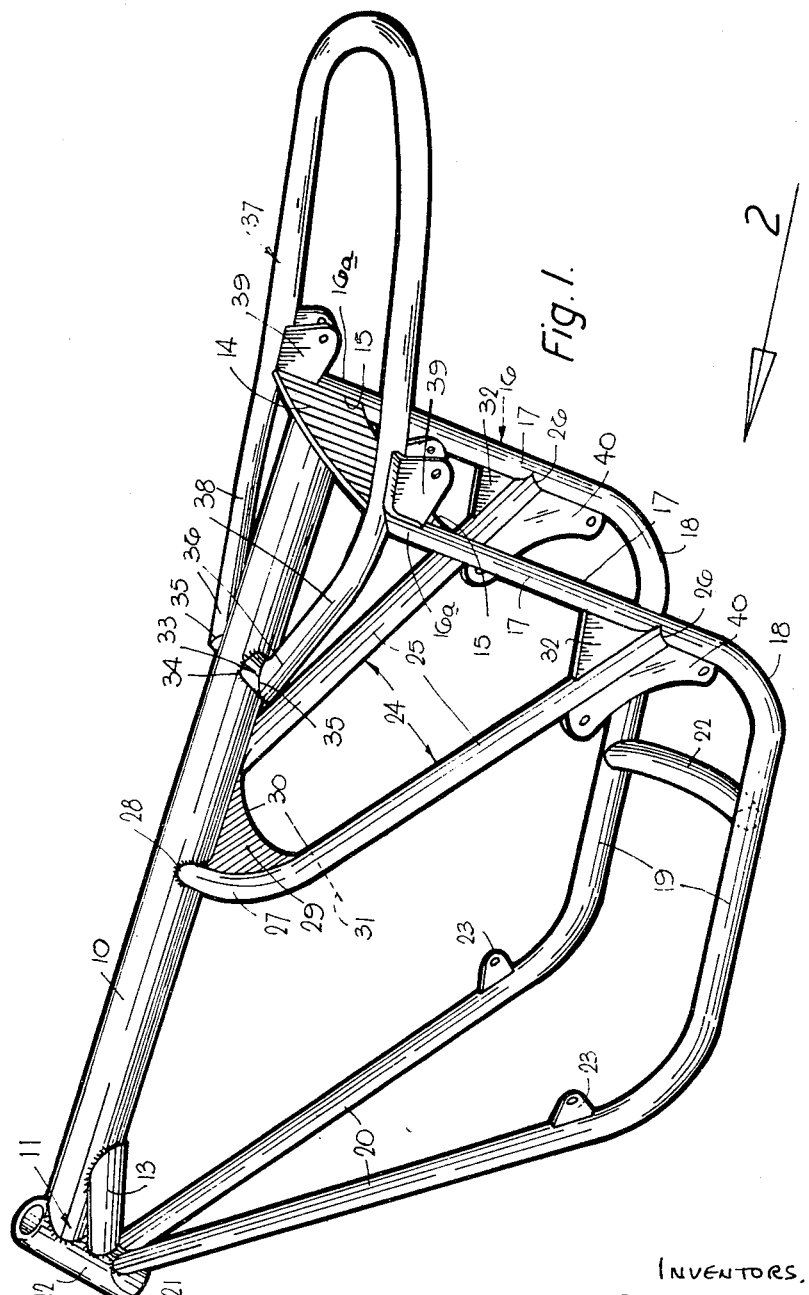
FIGURE 1 is a perspective view of a motorcycle frame constituting a first embodiment of the invention.
Figure 2:
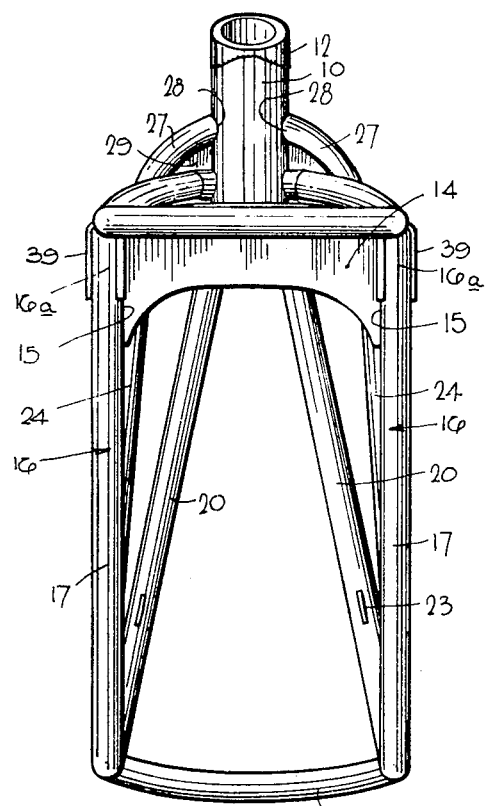
FIGURE 2 is an elevation of the frame of FIGURE 1 taken in the direction of the arrow 2 in FIGURE 1.

Referring now to FIGURES 1 and 2, the motorcycle frame there shown comprises a backbone 10 which is a tube of circular section. At its front end 11, the backbone is welded to a further tube 12 which provides a support for the front forks of the motorcycle and a gusset plate 13 is welded between the tubes 10 and 12.

At the rear end of the backbone 10 is welded thereto a plate 14 which acts as a shear web and which lies in a plane substantially normal to the longitudinal axis of the backbone 10. To opposed edges 15 of the plate 14, which edges lie substantially vertically, are welded the upper end portions 16a of tubes 16 comprising a first pair of tubes. As clearly seen in both FIGURES 1 and 2, the tubes 16 have straight portions 17 extending downwardly from the edges 15 of the plate 14. The tubes then bend forwardly at 18, extend horizontally as indicated at 19 and then extended at an upward inclination as indicated at 20 to be welded at their ends at 21 to the support tube 12. The horizontal portions 19 of the tubes 16 are connected by a cross member 22 and the inclined portions 20 carry engine mounting brackets 23.

The tubes of a second pair of tubes are indicated generally at 24. These tubes are inclined relative to the backbone 10 and have straight portions 25, the lower ends of which are welded at 26 to the straight portions 17 of the tubes 16. At their upper ends, the tubes 24 curve inwardly at 27 and are welded at 28 to the backbone 10. These curved portions 27 of the tubes are also welded to a gusset plate 29 and the lower edge 30 of the gusset plate is such that between the position indicated by the dotted line 31, which is opposite the lower edge 30 of the gusset plate, and the weld 26, extends the straight portion 25 of the tube.

The backbone 10, the straight portions 25 of the tubes 24 and the straight portions 17 of the tubes 16 are thus triangulated and form a pair of similar triangles the lower apex of each of which is reinforced by a gusset 32. The plate 14 comprises first rigid attachment means which extends transversely on both sides of the backbone 10 and is secured to the tubes 16 of a first pair. The curved portion 27 of the tubes 24 and the gusset 29 together constitute second atachment means which again is rigid and which extends transversely of the backbone on both sides thereof and the straight portions 25 of the tubes 24 extend between this second attachment means and the welds 26 where they are connected to the straight portions 17 of the tubes 16.

Third rigid attachment means is provided by a crosstube 33 which is passed through the backbone and welded thereto at 34 and the ends of which are mitred and welded at 35 to the ends 36 of a generally U-shaped tubular loop 37. Parts of the limbs of this loop indicated at 38 extend between the third attachment means 33 and the first attachment means comprising the plate 14 and are welded to the latter. These portions 38 comprise a third pair of tubes extending between the first attachment means 14 and the third attachment means 33.

The frame is completed by lugs 39 which are welded to the straight portions 17 of the tube 16 and to the loop 37 and which are located adjacent the junction between the straight portions 17 and the first attachment means 14. These lugs serve as attachment points for the rear suspension of the motorcycle, such suspension not being shown. Engine mounting plates 40 are also welded in position between the straight portions 25 of the tubes 24 and the lower parts of the straight portions 17 of the tubes 16.

A motorcycle frame is subject to three bending moments in dynamic load conditions these are:
(1) The pitching moment;
(2) The rolling moment;
(3) The yawing moment.

Of these, the first is normally the greatest. The above design is specifically directed to transmit these moments between the front and rear wheels with the minimum of undesirable deflections in the frame. For instance, with a normal pitching moment produced by an upward force on the front wheel, the tubes 24 will act as ties in the triangles formed by the backbone 10, the tubes 24 and the tubes 16.

Figure 4:
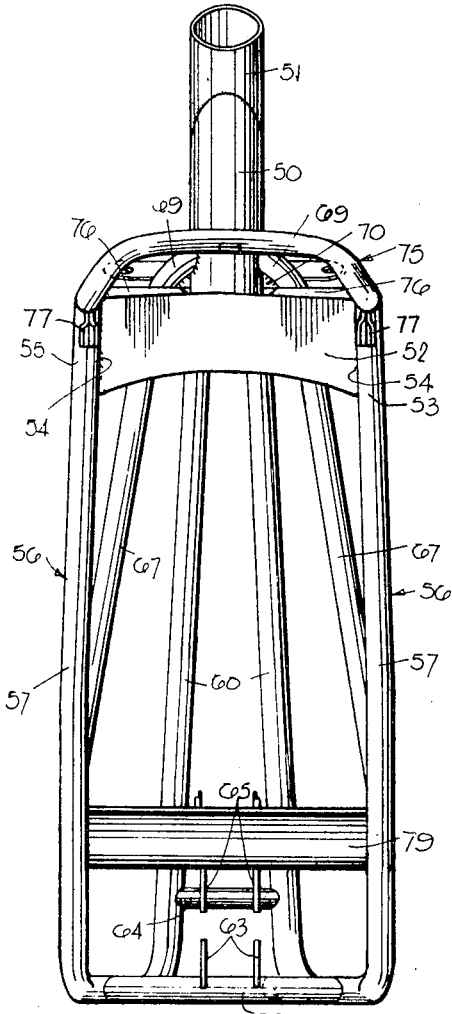

Referring now to FIGURES 3 and 4, these show a somewhat similar frame.

Referring to these figures, the frame comprises a backbone indicated generally at 50 which at its forward end is connected to a tube 51 forming a support for the front forks on the motorcycle and a tits rear end is welded to a plate 52. At its forward end 53 the backbone 50 is of oval section thus dispensing with the need to use a gusset plate such as that indicated at 13 in FIGURE 1.

Secured to the vertical edges 54 of the plate 52 are the upper ends 55 of a first pair of tubes indicated generally at 56. These tubes have downwardly projecting straight portions 57. Below the straight portions 57, the tubes 56 have forwardly inclined portions 58 which continue as generally horizontal portions 59 and then forwardly and upwardly inclined portions 60 which are welded at 61 to the support 51.

The horizontal portions 59 are interconnected by a tube 62 which carries engine mounting lugs 63 and the forwardly inclined portions 60 are interconnected by a tube 64 which carries engine mounting lugs 65.

A second pair of tubes is indicated at 66 and the tubes have straight portions 67 which are welded at their lower ends at 68 to the lower ends of the straight portions 57 of the tubes 56. The upper ends of the tubes 67 are curved as indicated at 69 and welded at 69a to the backbone 50. A gusset 70 is provided in a manner similar to the gusset 29 in FIGURES 1 and 2 so that the straight portions 67 of the tubes extend from the gusset 70 and the curved portions 69 which provide second attachment means to their joints with the first tubes 56.

Third attachment means is provided by a cross tube 71 which passes through the backbone and is welded thereto at 72. The ends of this tube are mitred as indicated at 73 and are joined to the ends 74 of a loop 75. Parts 76 of the limbs of the loop extend between the mitred ends 73 of the third attachment means and are welded to the plate 52 and constitute a third pair of tubes.

The frame is completed by lugs 77 which are secured to the loop 75 and the plate 52 and comprise mountings for the rear suspension, not shown, of the motorcycle.

Plates 78 are welded to the portions 58 of the tubes 56 and an arcuate member 79 extends between these plates and forms a mounting for the swinging rear fork of the motorcycle.

The operation of the frame shown in FIGURES 3 and 4 is similar to the operation of the fame shown in FIGURES 1 and 2 and we have found that in both cases we get an extremely stiff and light frame.

In each case, there is a tubular backbone 10 or 50, a support 12 or 51 for the front forks of the cycle secured to the front end of the backbone, first, transversely extending, rigid attachment means 14 and 52 and second transversely-extending rigid attachment means 27, 29 and 69, 70, which are secured to the backbone adjacent its rear end and intermediate its ends respectively, both said means projecting on both sides of the backbone. There is a first pair of spaced-apart substantially parallel tubes 17 and 57 extending generally downwardly from, and secured to, said first means and a second pair of spaced-apart substantially parallel tubes 25 and 67 which are inclined relative to the backbone and extend rearwardly from, and are secured to, the second attachment means, the tubes of each pair being arranged one on either side of the backbone, the tubes on one side of the backbone being joined and the tubes lying on the other side of the backbone being joined and all tubes being straight between their junctions and the attachment means.

We claim:
1. A motorcycle frame comprising a straight tubular backbone, a support for the front forks of the motorcycle secured to the front end of the backbone, first and second transversely-extending, rigid attachment means secured to the backbone adjacent its rear end and intermediate its ends respectively, said means projecting on both sides of the backbone, a first pair of spaced-apart substantially parallel tubes extending generally downwardly from, and secured to, said first means and a second pair of spaced-apart, substantially parallel tubes inclined relative to the backbone and extending rearwardly from, and secured to, said second means, the tubes of each pair being arranged one on either side of the backbone, the tubes lying to one side of the backbone being joined and the tubes lying to the other side of the backbone being joined, all said tubes being straight between their junctions and the attachment means.

2. A motorcycle frame according to claim 1 wherein the moment of inertia of the section of the backbone is considerably greater than the moments of inertia of the sections of the other tubes.

3. A motorcycle frame according to claim 1 wherein there is provided third transversely-extending rigid attachment means secured to the backbone to project on both sides thereof and located between the first and second attachment means and a third pair of tubes which extend between the first and third attachment means, the backbone being interposed between the tubes of the third pair.

4. A motorcycle frame according to claim 1 wherein the first attachment means comprises a plate secured to the backbone and lying in a plane substantially perpendicular to the longitudinal axis thereof.

5. A motorcycle frame according to claim 4 wherein the upper ends of the tubes of the first pair are secured to the edges of said plate.

6. A motorcycle frame according to claim 1 wherein the tubes of one of said pairs are continued to form a generally U-shaped cradle between said support and said junctions.

7. A motorcycle frame according to claim 1 wherein the second attachment means comprises curved continuations of the tubes of the second pair, said continuations having their ends connected directly to the backbone and being reinforced by gussets to form a rigid assembly.

8. A motorcycle frame according to claim 3 and including a generally U-shaped loop which extends rearwardly from the backbone at the rear end thereof, said loop joining the ends of said third pair of tubes.

9. A motorcycle frame according to claim 8 wherein the loop and the tubes of said third pair comprise a single piece of tube.

10. A motorcycle frame according to claim 1 including attachment lugs for the rear spring suspension of the motorcycle, the lugs being located adjacent the junctions of the first attachment means and the tubes of the first pair.

References Cited

UNITED STATES PATENTS

| D. 207,042 | 2/1967 | Otsuka et al. | D90—8 |
| D. 212,404 | 10/1968 | Bauer et al. | D90—8 |
| 2,535,540 | 12/1950 | Lechmere | 280—281 |
| 3,101,822 | 8/1963 | Clemens. | |

FOREIGN PATENTS

| 312,490 | 5/1929 | Great Britain. |
| 1,082,317 | 6/1954 | France. |

KENNETH H. BETTS, Primary Examiner